US009475346B2

United States Patent
Renis et al.

(10) Patent No.: US 9,475,346 B2
(45) Date of Patent: Oct. 25, 2016

(54) TREAD BAND WITH ASYMMETRIC GROOVES TO REDUCE DEBRIS RETENTION

(75) Inventors: Davide Renis, Pomezia (IT); Andrea Scatamacchia, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 544 days.

(21) Appl. No.: 13/980,121

(22) PCT Filed: Feb. 14, 2012

(86) PCT No.: PCT/IB2012/050673
§ 371 (c)(1),
(2), (4) Date: Oct. 18, 2013

(87) PCT Pub. No.: WO2012/110956
PCT Pub. Date: Aug. 23, 2012

(65) Prior Publication Data
US 2014/0048191 A1 Feb. 20, 2014

(30) Foreign Application Priority Data
Feb. 14, 2011 (IT) .............................. TO2011A0125

(51) Int. Cl.
*B60C 11/13* (2006.01)
*B60C 11/03* (2006.01)

(52) U.S. Cl.
CPC ........ *B60C 11/1323* (2013.04); *B60C 11/0306* (2013.04); *B60C 11/1315* (2013.04)

(58) Field of Classification Search
CPC ............... B60C 11/03; B60C 11/0304; B60C 11/0302; B60C 11/0309; B60C 2011/0346; B60C 11/04; B60C 11/042; B60C 11/045; B60C 11/13; B60C 1/1307; B60C 11/1315; B60C 11/1323; B60C 11/1384; B60C 11/1392; B60C 11/047
USPC .......... 152/DIG. 1, 900, 901, 209.24, 209.18
See application file for complete search history.

(56) References Cited

U.S. PATENT DOCUMENTS

| 2,604,920 | A | * | 7/1952 | Kirby | .................. | B60C 11/0309 152/151 |
| 3,664,402 | A | * | 5/1972 | Montagne | ........... | B60C 11/0309 152/209.24 |
| 4,550,756 | A | * | 11/1985 | Hinkel | .................... | B60C 11/01 152/209.24 |
| 4,630,661 | A | * | 12/1986 | Stelzer | ................ | B60C 11/0309 152/209.21 |
| 5,246,049 | A | * | 9/1993 | Ramcke | .............. | B60C 11/0309 152/209.21 |
| 5,373,881 | A | * | 12/1994 | Enoki | ..................... | B60C 11/04 152/209.18 |
| 2006/0130950 | A1 | * | 6/2006 | Murata | ............... | B60C 11/0302 152/209.24 |
| 2009/0255614 | A1 | * | 10/2009 | Ebiko | ................. | B60C 11/0302 152/209.8 |
| 2010/0212795 | A1 | * | 8/2010 | Murata | ............... | B60C 11/0304 152/209.18 |

FOREIGN PATENT DOCUMENTS

EP  1 661 732 A2   5/2006
JP  2008-296795 A   12/2008

* cited by examiner

*Primary Examiner* — Eric Hug
(74) *Attorney, Agent, or Firm* — Sughrue Mion, PLLC

(57) ABSTRACT

A tread band having at least one longitudinal groove bounded by a bottom wall, and by two sidewalls; each sidewall of the longitudinal groove has a continuous sequence of alternating projections and recesses, which extend crosswise so that, in plan view, the first longitudinal groove is zigzag shaped; each projection of one sidewall of the longitudinal groove always faces a recess in the other sidewall of the longitudinal groove; and, at all the projections, an outer portion of each sidewall slopes at a first obtuse angle to the bottom wall, and, at all the recesses, an outer portion of each sidewall slopes at a second obtuse angle, different from the first obtuse angle, to the bottom wall.

12 Claims, 5 Drawing Sheets

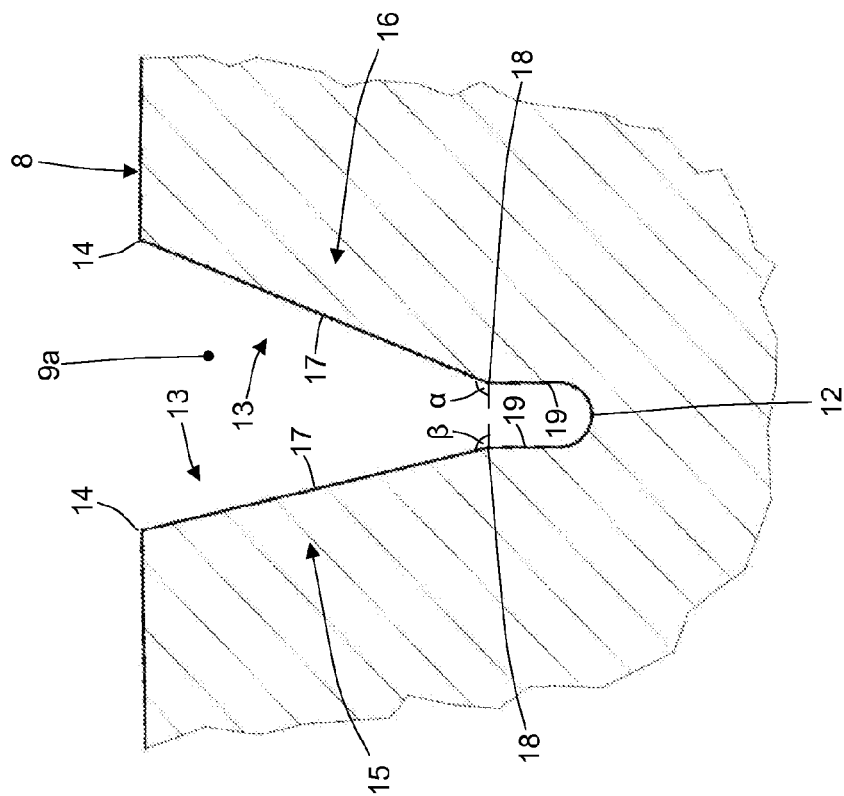
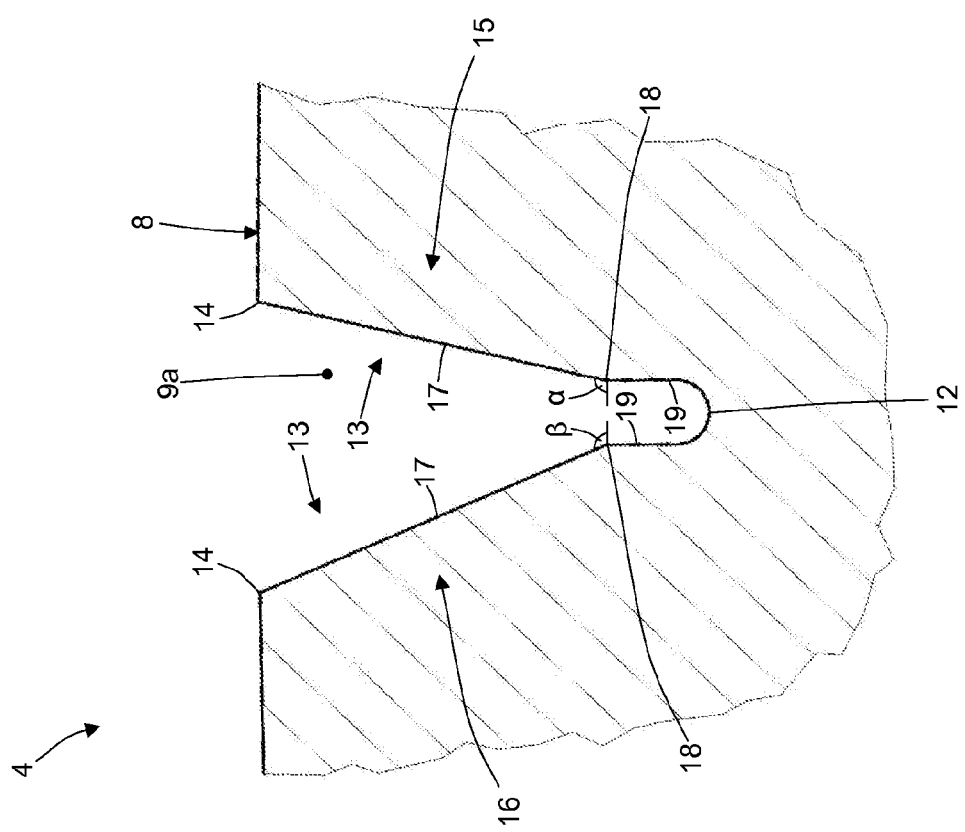
Fig. 5
Fig. 4

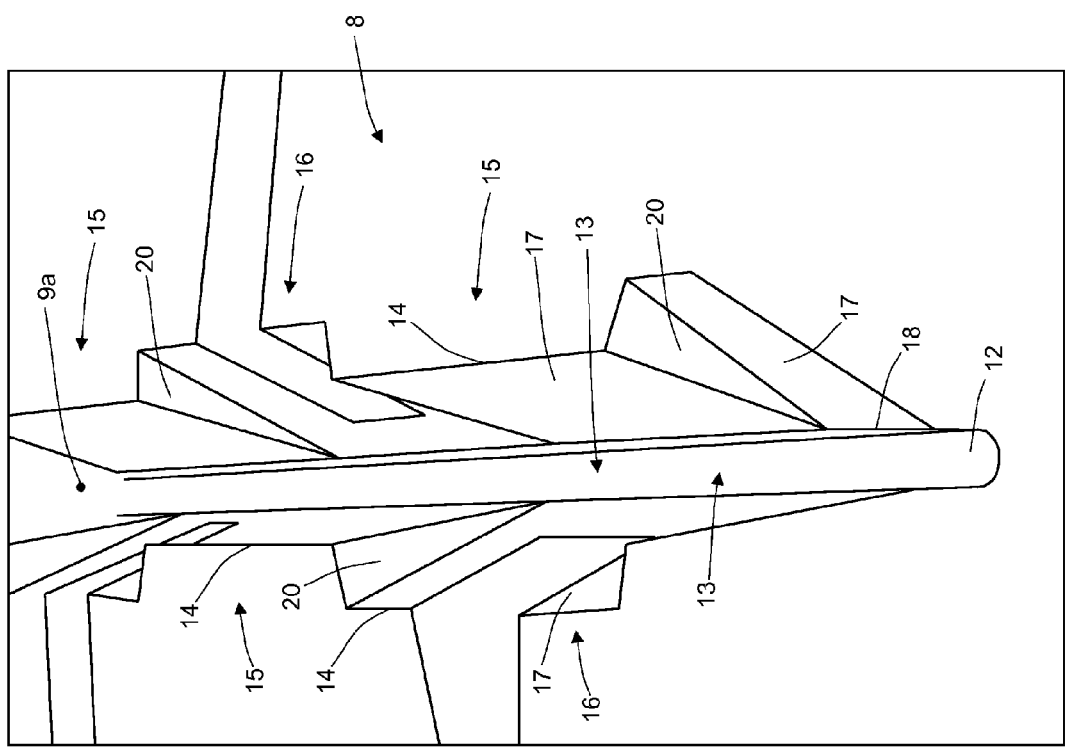

TREAD BAND WITH ASYMMETRIC GROOVES TO REDUCE DEBRIS RETENTION

CROSS REFERENCE TO RELATED APPLICATIONS

This is a National Stage of International Application No. PCT/IB2012/050673, filed Feb. 14, 2012, claiming priority from Italian Patent Application No. TO2011A000125, filed Feb. 14, 2011, the contents of all of which are incorporated herein by reference in their entirety.

TECHNICAL FIELD

The present invention relates to a tread band.

The present invention may be used to advantage on TBR (Truck and Bus Radial), i.e. heavy-duty vehicle, winter tyres.

BACKGROUND ART

Currently marketed heavy-duty vehicle tyres have a tendency to pick up road surface debris (typically stones), which clings, even for long periods of time, to the inside of the longitudinal (circumferential) tread grooves. As the tyre rolls along the road surface, the debris clinging to the longitudinal grooves in the tread is rammed cyclically to the bottom of the grooves, thus damaging the rubber (in the worst case scenario, the debris may even be elongated, with a pointed tip facing the bottom of the groove). In addition, debris retention inside the longitudinal tread grooves forms 'dams', which prevent water from running off and draining along the grooves, thus impairing wet-pavement road-holding performance of the tyre.

Debris retention inside the longitudinal tread grooves is especially problematic in the case of winter tyres, which have at least one zigzag-shaped longitudinal groove—i.e. each sidewall of the longitudinal groove has a continuous sequence of alternating transverse (axial) projections and recesses —designed to trap snow (and so improve road-holding performance on snow-covered roads), but which also forms a succession of longitudinal debris-retaining 'pockets'.

Patent application JP2008296795 discloses a pneumatic tire reducing stone trapping in a main groove. In the pneumatic tire, a central main groove and a shoulder main groove are provided on a tread part; in the central main groove and the shoulder main groove, a groove wall surface in a groove cross section perpendicular to a groove length direction comprises a base part vertically extending from a groove bottom to a tread stepping surface side or extending at an inclination in a direction for increasing groove width and a slack slope part extending from an upper end of the base part to a tread stepping surface at the slack inclination than the base part.

DESCRIPTION OF THE INVENTION

It is an object of the present invention to provide a tread band designed to eliminate the above drawbacks, and which, in particular, is cheap and easy to produce.

According to the present invention, there is provided a tread band as defined in the accompanying Claims.

BRIEF DESCRIPTION OF THE DRAWINGS

A non-limiting embodiment of the invention will be described by way of example with reference to the accompanying drawings, in which:

FIG. 4 shows a schematic, larger-scale cross section along line IV-IV of a longitudinal groove of the FIG. 1 tyre tread band;

FIG. 5 shows a schematic, larger-scale cross section along line V-V of a longitudinal groove of the FIG. 1 tyre tread band;

FIG. 6 shows a schematic view in perspective, with parts removed for clarity, of a longitudinal groove of the FIG. 1 tyre tread band.

PREFERRED EMBODIMENTS OF THE INVENTION

Figure 1:
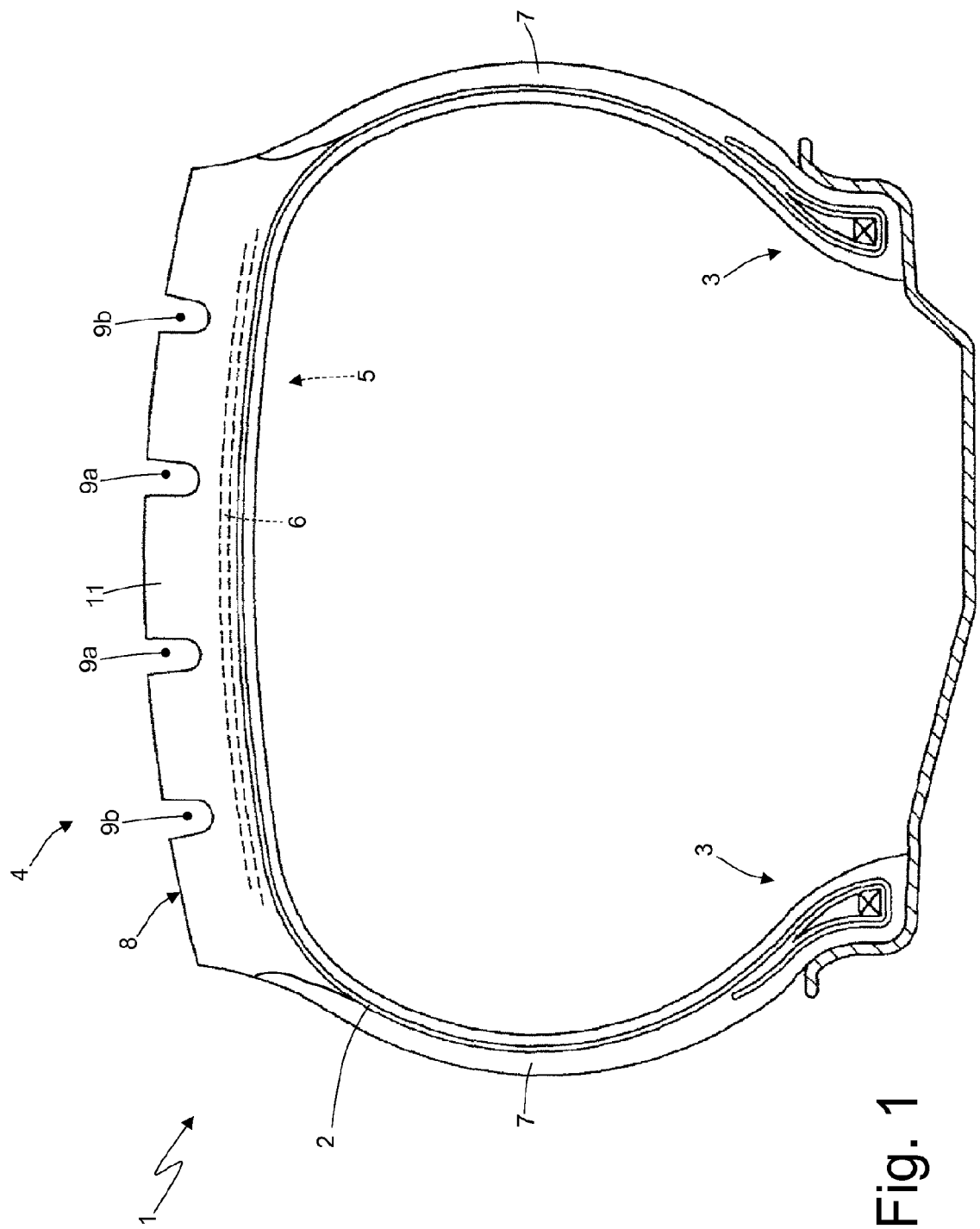
FIG. 1 shows a schematic side section of a tyre featuring a tread band in accordance with the present invention.

Number 1 in FIG. 1 indicates as a whole a tyre comprising a toroidal body ply 2, which has two beads 3 and supports a tread band 4 made of cured-rubber-based material. A tread belt 5, comprising two tread plies 6, is interposed between body ply 2 and tread band 4. Each tread ply 6 comprises a rubber strip embedding a number of cords (not shown), which are arranged side by side with a given spacing, and slope at a given angle to the equatorial plane of tyre 1. Body ply 2 also supports two sidewalls 7 between tread band 4 and beads 3.

Figure 2:
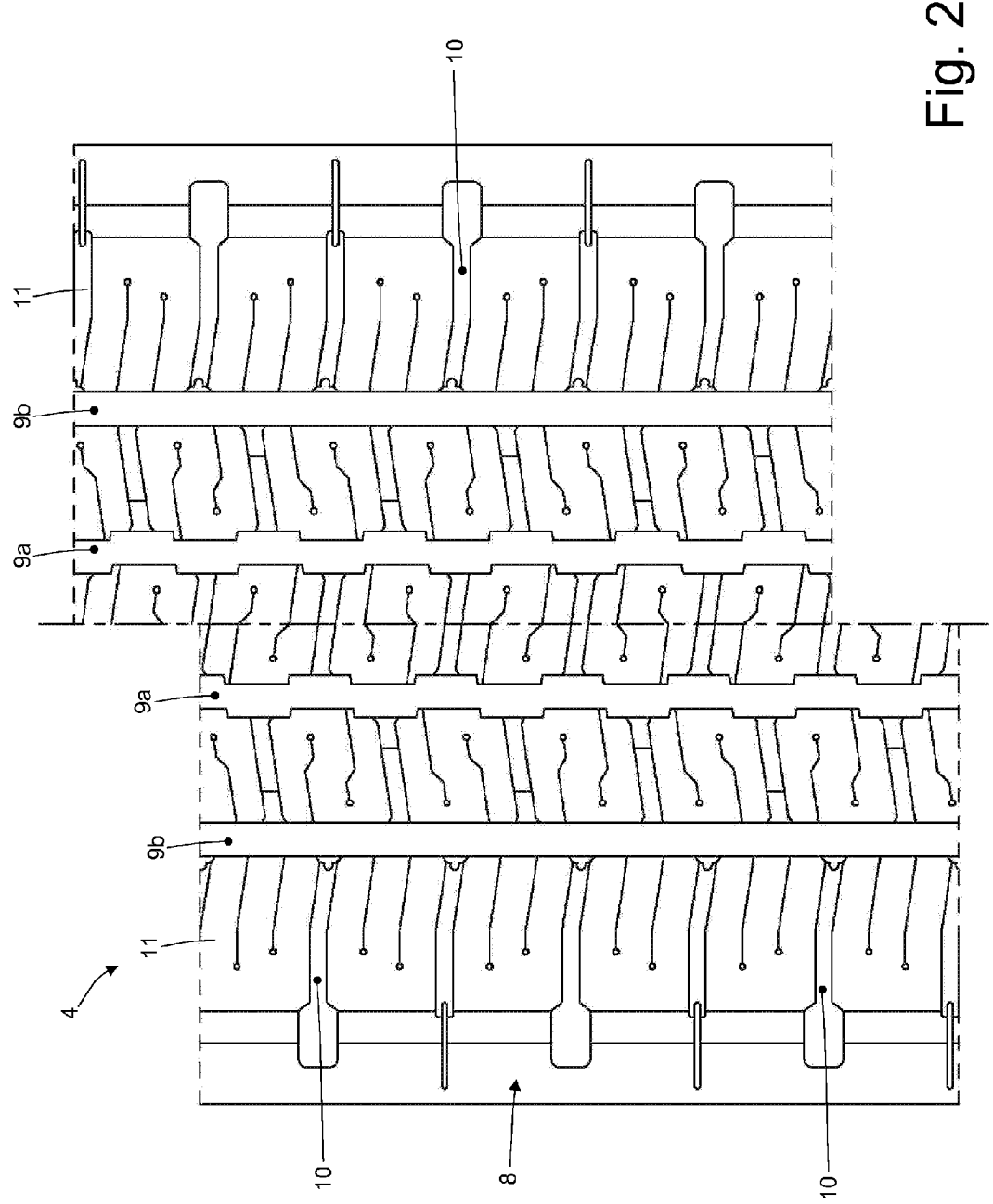
FIG. 2 shows a schematic, larger-scale plan view of part of the FIG. 1 tyre tread band.

As shown more clearly in FIG. 2, tread band 4 has a rolling surface 8, which bounds tread band 4 externally (i.e. is located radially outwards) and, in use, rests on the road surface. Rolling surface 8 of tread band 4 has a raised pattern defined by a number of longitudinal or circumferential grooves 9 (i.e. extending along the circumference, and crosswise to the axis of rotation, of tyre 1), and by a number of transverse grooves 10 (i.e. parallel to the axis of rotation of tyre 1 and perpendicular to longitudinal grooves 9). Longitudinal grooves 9 and transverse grooves 10 form five longitudinal rows of blocks 11 projecting radially from tread band 4, and each of which is roughly parallelepiped-shaped with a rectangular or trapezoidal cross section, and is bounded laterally by grooves 9 and 10.

More specifically, tread band 4 comprises two side by side, central longitudinal grooves 9a; and two lateral longitudinal grooves 9b with a rectangular cross section and located on either side of central longitudinal grooves 9a. In one embodiment, the two lateral longitudinal grooves 9b may be shallower (even 50% shallower) than central longitudinal grooves 9a. In another embodiment, not shown, tread band 4 may comprise a further two lateral longitudinal grooves on either side (i.e. outwards) of the two lateral longitudinal grooves 9b.

As shown in FIGS. 4 and 5, each longitudinal groove 9a is bounded by a bottom wall 12; and two sidewalls 13 on either side of bottom wall 12 and forming respective outer edges 14 with rolling surface 8.

Figure 3:
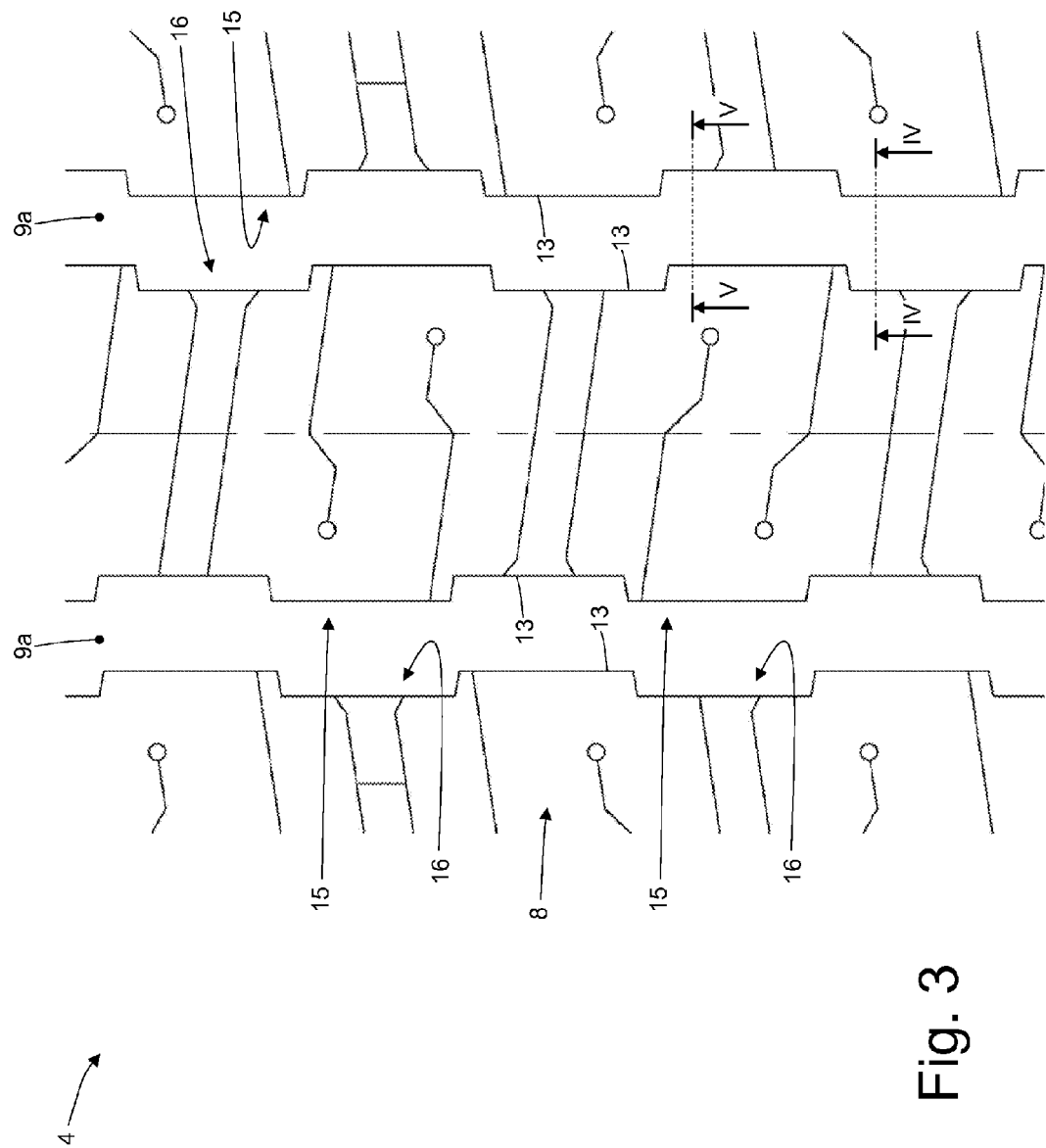
FIG. 3 shows a larger-scale detail of FIG. 2.

As shown in FIG. 3, the two sidewalls 13 of each central longitudinal groove 9a have a continuous sequence of alternating transverse (axial) projections and recesses 16, so that, in plan view, central longitudinal groove 9a is zigzag-shaped (i.e. with abrupt alternating right and left turns). More specifically, each projection 15 of one sidewall 13 faces and is aligned (coincident) with a recess 16 in the other sidewall 13, so the transverse width of each central longitudinal groove 9a (i.e. the distance between the two sidewalls 13) is constant longitudinally (i.e. for a given depth or radial position).

As shown in FIGS. 4 and 5, each sidewall 13 of each central longitudinal groove 9a has an outer portion 17 extending between an outer edge 14 and an intermediate line 18, and which slopes at an obtuse angle α or β (i.e. of over 90°) with respect to bottom wall 12; and an inner portion 18 extending between intermediate line 18 and bottom wall 12, and which forms a right-angle (i.e. of 90°) with bottom wall 12. Outer portion 17 of each sidewall 13 slopes at an obtuse angle α to bottom wall 12 at all the projections 15, and at an obtuse angle β, different from obtuse angle α, to bottom wall 12 at all the recesses 16. Each central longitudinal groove 9a is thus asymmetrical (i.e. varies in cross section, as shown clearly in FIGS. 4 and 5), by part of each sidewall 13 sloping at obtuse angle α to bottom wall 12 (at projections 15), and the rest of sidewall 12 sloping at obtuse angle β to bottom wall 12 (at recesses 16).

Each central longitudinal groove 9a has a rectangular cross section between inner portions 19 of sidewalls 13, and a trapezoidal cross section between outer portions 17 of sidewalls 13.

In a preferred embodiment, obtuse angle β is greater than obtuse angle α. More specifically, obtuse angle β may range between 110° and 115°, and obtuse angle α between 100° and 105°. These values allow for achieving the best compromise between the need to expel debris trapped inside the two central longitudinal grooves 9a, and the need to ensure high performance (particularly road-holding performance) on snow.

In a preferred embodiment shown in FIG. 6, each projection 15 is bounded laterally, inside central longitudinal groove 9a, by two shoulders 20, which are located on either side of projection 15, connect projection 15 to the two recesses 16 on either side of (i.e. adjacent to) projection 15, and are triangular in shape, with a bottom vertex at intermediate line 18.

Tread band 4 has numerous advantages.

In particular, it is cheap and easy to produce using a conventional mold.

Moreover, it provides for excellent road-holding on snow, due to the zigzag pattern of the two central longitudinal grooves 9a, which 'trap' snow inside.

Any debris trapped inside the two central longitudinal grooves 9a is expelled by virtue of the slope of sidewalls 13, which exerts outward radial thrust on the debris to expel it radially.

The narrow width of the bottom of each central longitudinal groove 9a (i.e. the part between inner portions 19 of sidewalls 13) greatly reduces the likelihood of the tip of any pointed debris, trapped inside a central longitudinal groove 9a, reaching and damaging the bottom of the groove.

Finally, tread band 4 described is ideal for year-round use. Tyre 1 is fitted, new, at the start of winter, to run on snow throughout the winter with deep longitudinal grooves 9 for good road-holding performance. By the time longitudinal grooves 9 are worn (i.e. lateral longitudinal grooves 9b are practically gone, and central longitudinal grooves 9a have practically lost their zigzag pattern and are substantially worn down to the bottom portion between inner portions 19 of sidewalls 13), winter is over, and, though performance of tread band 4 (in particular, road-holding performance) is poor on snow (which is no longer an issue by the end of winter), it is still good on snow-free road surfaces (which means any, by the end of winter).

The invention claimed is:

1. A tread band comprising at least one first longitudinal groove bounded by a bottom wall, and by two sidewalls located on opposite sides of the bottom wall and forming two corresponding outer edges with a rolling surface;

each sidewall of the first longitudinal groove has a continuous sequence of alternating projections and recesses, which extend crosswise so that, in plan view, the first longitudinal groove is zigzag shaped; and each projection of one sidewall of the first longitudinal groove faces a corresponding one of the recesses in the other sidewall of the first longitudinal groove;

each sidewall of the first longitudinal groove comprises an outer portion extending between a corresponding one of the outer edges and a corresponding intermediate line and sloping at an obtuse angle to the bottom wall; and an inner portion extending between the corresponding intermediate line and the bottom wall and forming a right-angle with the bottom wall; and at all the projections, the outer portion of each sidewall slopes at a first obtuse angle to the bottom wall, and, at all the recesses, the outer portion of each sidewall slopes at a second obtuse angle, different from the first obtuse angle, to the bottom wall;

wherein each outer edge is defined by a series of alternating straight segments corresponding to the continuous sequence of alternating projections and recesses, and on each side of the first longitudinal groove, the straight segments corresponding to the projections are aligned along a same first circumferential line and the straight segments corresponding to the recesses are aligned along a same second circumferential line.

2. A tread band as claimed in claim 1, wherein the second obtuse angle is greater than the first obtuse angle.

3. A tread band as claimed in claim 1, wherein the second obtuse angle ranges between 110° and 115°.

4. A tread band as claimed in claim 1, wherein the first obtuse angle ranges between 100° and 105°.

5. A tread band as claimed in claim 1, wherein each first longitudinal groove has a rectangular cross section between the inner portions of the two sidewalls, and a trapezoidal cross section between the outer portions of the two sidewalls.

6. A tread band as claimed in claim 1, and comprising two side by side, central first longitudinal grooves; and two lateral second longitudinal grooves with a rectangular cross section.

7. A tread band as claimed in claim 6, wherein the lateral second longitudinal grooves are shallower than the central first longitudinal grooves.

8. A tread band as claimed in claim 1, wherein each projection is bounded laterally, inside the first longitudinal groove, by two shoulders located on opposite sides of the projection, and which connect the projection to the two recesses adjacent to the projection.

9. A tread band as claimed in claim 8, wherein each shoulder is triangular, with a bottom vertex located at the intermediate line.

10. A tread band comprising at least one first longitudinal groove bounded by a bottom wall, and by two sidewalls located on opposite sides of the bottom wall and forming two corresponding outer edges with a rolling surface;

each sidewall of the first longitudinal groove has a continuous sequence of alternating projections and recesses, which extend crosswise so that, in plan view, the first longitudinal groove is zigzag shaped;

each projection of one sidewall of the first longitudinal groove faces a corresponding one of the recesses in the other sidewall of the first longitudinal groove;

each sidewall of the first longitudinal groove comprises an outer portion extending between a corresponding one of the outer edges and a corresponding intermediate line and sloping at an obtuse angle to the bottom wall; and an inner portion extending between the corresponding intermediate line and the bottom wall and forming a right-angle with the bottom wall; and at all the projections, the outer portion of each sidewall slopes at a first obtuse angle to the bottom wall, and, at all the recesses, the outer portion of each sidewall slopes at a second obtuse angle, different from the first obtuse angle, to the bottom wall;

wherein there are provided two side by side, central first longitudinal grooves; and two lateral second longitudinal grooves with a rectangular cross section; and wherein the lateral second longitudinal grooves are shallower than the central first longitudinal grooves.

11. A tread band comprising at least one first longitudinal groove bounded by a bottom wall, and by two sidewalls located on opposite sides of the bottom wall and forming two corresponding outer edges with a rolling surface;

each sidewall of the first longitudinal groove has a continuous sequence of alternating projections and recesses, which extend crosswise so that, in plan view, the first longitudinal groove is zigzag shaped;

each projection of one sidewall of the first longitudinal groove faces a corresponding one of the recesses in the other sidewall of the first longitudinal groove;

each sidewall of the first longitudinal groove comprises an outer portion extending between a corresponding one of the outer edges and a corresponding intermediate line and sloping at an obtuse angle to the bottom wall; and an inner portion extending between the corresponding intermediate line and the bottom wall and forming a right-angle with the bottom wall; and at all the projections, the outer portion of each sidewall slopes at a first obtuse angle to the bottom wall, and, at all the recesses, the outer portion of each sidewall slopes at a second obtuse angle, different from the first obtuse angle, to the bottom wall;

wherein each projection is bounded laterally, inside the first longitudinal groove, by two shoulders located on opposite sides of the projection, and which connect the projection to the two recesses adjacent to the projection; and wherein each shoulder is triangular, with a bottom vertex located at the corresponding intermediate line.

12. A tread band comprising at least one first longitudinal groove bounded by a bottom wall, and by two sidewalls located on opposite sides of the bottom wall and forming two corresponding outer edges with a rolling surface;

each sidewall of the first longitudinal groove has a continuous sequence of alternating projections and recesses, which extend crosswise so that, in plan view, the first longitudinal groove is zigzag shaped;

each projection of one sidewall of the first longitudinal groove faces a corresponding one of the recesses in the other sidewall of the first longitudinal groove;

each sidewall of the first longitudinal groove comprises an outer portion extending between a corresponding one of the outer edges and a corresponding intermediate line and sloping at an obtuse angle to the bottom wall; and an inner portion extending between the corresponding intermediate line and the bottom wall and forming a right angle with the bottom wall; and at all the projections, the outer portion of each sidewall slopes at a first obtuse angle to the bottom wall, and, at all the recesses, the outer portion of each sidewall slopes at a second obtuse angle, different from the first obtuse angle, to the bottom wall;

wherein, along the entire length of the first longitudinal groove, all the second obtuse angles are equal, all the first obtuse angles are equal, and all the second obtuse angles are greater than all the first obtuse angles.

* * * * *